United States Patent [19]

Amstutz et al.

[11] Patent Number: 4,886,327
[45] Date of Patent: Dec. 12, 1989

[54] LIGHTED DISPLAY CASE

[75] Inventors: Douglas D. Amstutz, Muskegon; Ronald A. Vanderboegh, Twin Lakes, both of Mich.

[73] Assignee: Amstore Corporation, Muskegon, Mich.

[21] Appl. No.: 161,902

[22] Filed: Feb. 29, 1988

[51] Int. Cl.$^4$ .............................................. A47B 43/00
[52] U.S. Cl. .................................. 312/257.1; 312/114; 403/403
[58] Field of Search ......... 312/114, 140, 263, 257 SK, 312/257 R; 403/403, 205, 231

[56] References Cited

U.S. PATENT DOCUMENTS

| | | | |
|---|---|---|---|
| 1,846,485 | 2/1932 | Hart. | |
| 1,953,357 | 4/1934 | Leya | 312/114 X |
| 1,966,964 | 7/1934 | Kennedy | 312/114 |
| 2,171,378 | 8/1939 | Urbanek | 312/114 |
| 2,475,079 | 7/1949 | Clouse et al. | 312/114 |
| 2,546,564 | 3/1951 | Roselyn | 312/140 |
| 4,196,952 | 4/1980 | Crowe | 312/140 X |
| 4,385,850 | 5/1983 | Bobath | 403/403 X |
| 4,556,148 | 12/1985 | Koller | 312/140 X |

FOREIGN PATENT DOCUMENTS 2324919  5/1973  Fed. Rep. of Germany ...... 312/275 SK Primary Examiner—Joseph Falk
Attorney, Agent, or Firm—Warner, Norcross & Judd

[57] ABSTRACT

A merchandise showcase including transparent side and top windows and illumination means for a display portion of the showcase. A frame for mounting the windows is fabricated from roll-formed stainless steel with very little welding. Frame corner posts are frictionally and adhesively held within a channel in a top frame member by a wedge member inserted into the channel along with a top portion of the corner posts. Side window retention means firmly but flexibly grasp the edge portions of each side window and thereby utilize the windows as structural members to add strength to the showcase. The illumination assembly includes a lighting fixture and a down-feed tube for shielding the electrical feed wires. The tube is joined to the fixture only by the wires extending through both to allow the illumination assembly to be compactly folded for storage or shipping. The down-feed tube is rigid and of a predetermined length, so that with one end positioned with respect to the bottom of the showcase, the other end will be within the lighting fixture.

6 Claims, 6 Drawing Sheets

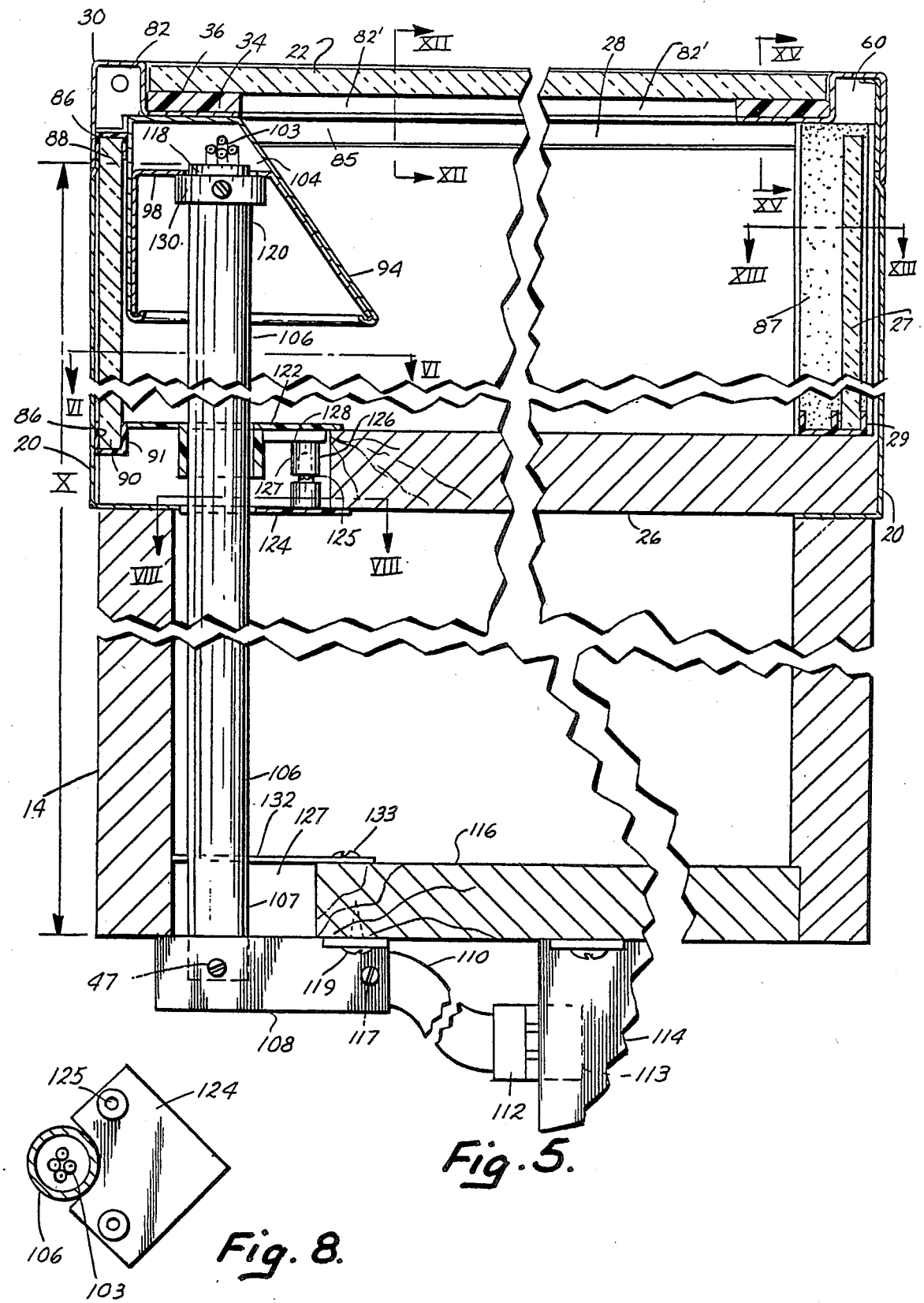

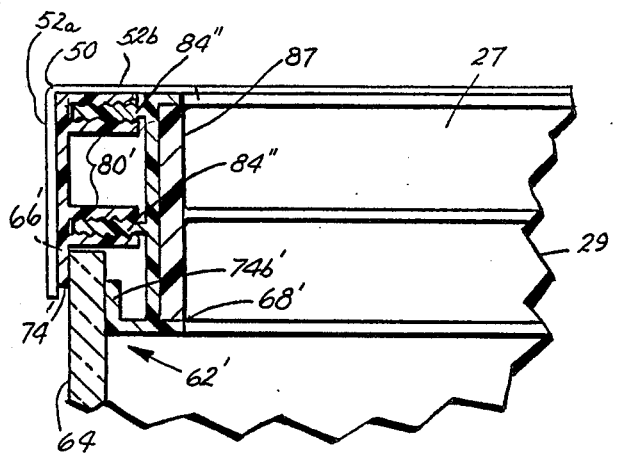
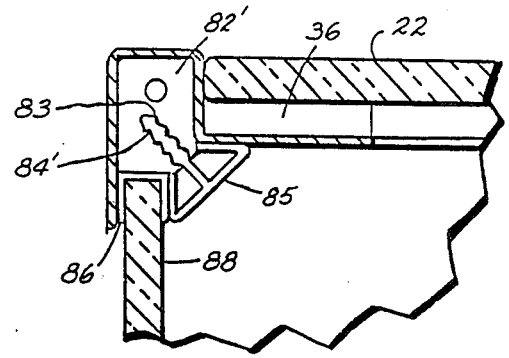
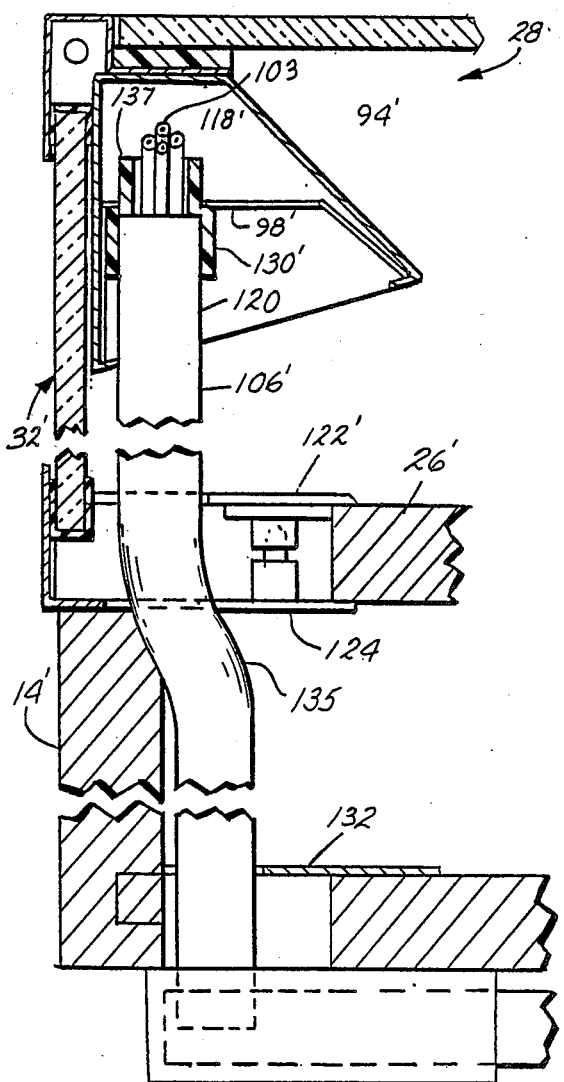
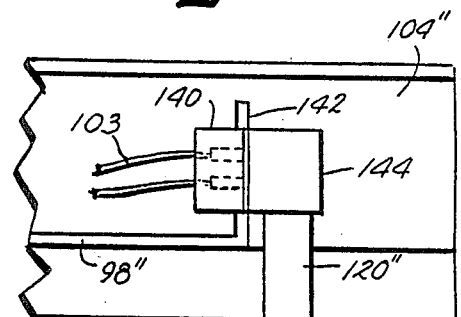
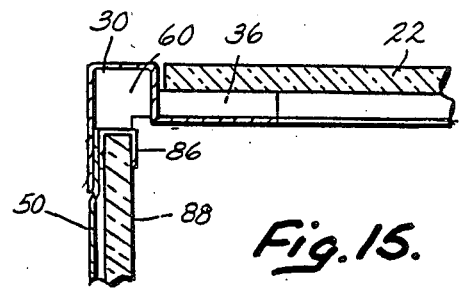
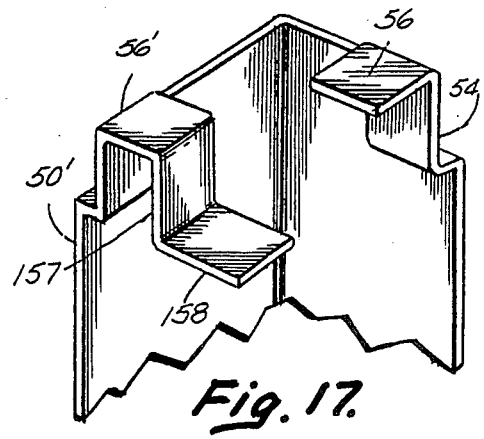

LIGHTED DISPLAY CASE

BACKGROUND OF THE INVENTION

This invention is related to a merchandise showcase and in particular to a showcase of the type having transparent side and top windows for viewing merchandise within the case and illumination means for illuminating the display portion of the showcase.

Illuminated showcases are well-known for displaying merchandise such as jewelry and the like. A conventional showcase has a unitary frame attached to a lower base and glass panels mounted within the frame. One prior art frame is constructed from rolled stainless steel members which are welded together and polished at the corners. A second frame is constructed from aluminum extrusions interconnected by screwed fittings. Various brackets have been devised for retaining the windows within the frame. If merchandise lighting is desired, a lighting fixture, such as a fluorescent lighting fixture, is mounted under the front frame member to direct the light downwardly onto the merchandise. In order to electrically connect the lighting fixture with an electrical source within the showcase base, insulated electrical conductors are routed in the vicinity of a vertical corner member of the frame and may be concealed within the vertical member.

While the conventional showcase, having a stainless steel frame, is quite satisfactory and pleasing in appearance, it is extremely expensive to produce. The corner welds must be individually made and polished smooth, which is very labor intensive. Further, special jigs are required for each unique configuration of the showcase and skilled laborers, including metal finishers, are needed to construct the showcase. Showcases having an extruded aluminum frame have an inexpensive appearance unacceptable to many retailers. The fastened joints tend to separate with repeated stress from the opening and closing of the rear access doors, making the appearance degrade further with use. In both types of showcases, the assembly of the illumination system, including the electrical interconnections, is completely manual and must be performed by a skilled electrician.

SUMMARY OF THE INVENTION

A showcase according to a first aspect of the present invention has a frame including a top frame member supporting a top horizontal window and corner members supporting the top frame member. The top frame is made from a single rolling of stainless steel which is appropriately notched and formed into a plurality of adjacent interconnected side members, each having a first horizontal surface which supports the top window and a second horizontal surface which is above and outward of the first horizontal surface to form a border around the top window. The adjacent edges of the side members defining the notch butt together at the corners of the frame. The side member corners are strengthened by spot welding the adjacent portions of the first horizontal surface. Because an opaque cushion is positioned between the top window and the first horizontal surface, any discoloration of the metal resulting from the spot welding of the first surface is covered by the cushion so that it is not visible through the top window. The abutting edges of the second horizontal surface, bordering the top window, are aesthetically pleasing.

In a second aspect of the invention, corner posts are likewise formed from stainless steel rollings. Each corner post has a pair of sidewalls angled according to the orientation of the side members at the corresponding corner of the top frame member. A top portion of each post fits within a downward groove in the top frame. An L-shaped wedge member, that may be inexpensive cast aluminum, is inserted into the groove to frictionally retain the corner post in the groove and align the vertical surfaces of the corner post and top frame. An adhesive between the wedge and the groove holds the wedge member, and hence each corner post in rigid engagement with the top frame without requiring welding or screw fasteners. The concealed top portion of each corner post is slightly inset so that the exposed vertical surfaces of the bottom portion are flush with the top frame member and appear as a continuous extension thereof, providing visual unity to the frame assembly.

In a third aspect, the present invention provides special retention means for firmly, but flexibly, retaining the side windows in the frame. The retention means includes mounting means for the lateral ends of the glass including an attachment member affixed to the inside of each corner post and a retention member which engages the attachment member and provides a compression force against the glass plate, which is positioned between the retention and the attachment members. The attachment and retention members are formed as an extrusion of a polymeric material and are provided with gripping means on outer portions thereof for frictionally gripping the lateral ends of the glass plate. In a preferred embodiment, the gripping means is provided by co-extruding the attachment and retention members with outer portions formed of a lower durometer material, which provides a high friction surface for contacting the window. The engagement means for engaging the attachment and retention members is formed as an integral portion of the members during the extrusion of the members and provides variable spacing between the retention and attachment members so that the retention means may retain side windows of various thickness glass.

The side window retention means preferably further includes a member, such as a flexible gasket, mounted along the top and bottom end portions of each side window. The gaskets provide high friction engagement between the side window top and bottom portions and the top and bottom frame members. Spacer members are placed at selected locations along the top of the side windows and provide support between center portions of the top frame side members and the side windows to prevent sagging of the top frame. Slits may be formed in the spacer members to receive a trim strip to provide a finished appearance for the interior upper horizontal corners. In one embodiment, the decorative strip is identical to the side window retention member in order to reduce the number of components needed.

The side window retention means not only securely retains the side windows within the frame, but additionally forms an important integral portion of the showcase structure. By providing a positive, yet flexible structural engagement between the edge portions of each side window and the adjacent corner posts, top frame and bottom frame, the window retention means utilizes the windows as an integral structural member in the showcase structure. With the increased strength provided by the side window retention means, a showcase according to the present invention is surprisingly rigid, notwithstanding the use of rolled metal frame members assembled with an adhesive and a minimum amount of welding.

In a fourth aspect, the present invention provides a showcase having illumination means for illuminating merchandise displayed within the showcase The illuminating means of the present invention includes a lighting fixture for mounting within the showcase under the front portion of the top frame and illuminating downwardly. A rigid down-feed tube is provided adjacent one end of the lighting fixture. The down-feed tube provides a conduit for the electrical wiring extending from the base of the showcase to the lighting fixture. To allow the illumination assembly to be compactly folded for storage or shipping, so that it may be manufactured at a location separate from the assembly of the case, there is no connection between the down-feed tube and the lighting fixture. The only tie that may be included between the tube and the lighting fixture is the electrical feed wires extending through the down-feed tube and into the fixture which are flexible and do not interfere with a folding together of the fixture and down-feed tube.

In order to assure that the electrical wires will be properly shielded their entire length in the fully-assembled showcase, the down-feed tube is supplied in a predetermined length which is selected such that, with the down-feed tube vertically oriented within the showcase, aligned with an opening in a bottom wall of the lighting fixture and its bottom end in contact with the bottom or base of the showcase, the top end of the down-feed tube will extend into the interior of the lighting fixture. In this manner, the process of mounting the lighting system in the showcase will cause the down-feed tube to extend fully from the light fixture to the bottom of the case so that no electrical wiring will be exposed, where it may be damaged. The down-feed tube passes through an opening in a horizontal deck which divides the showcase interior into a display portion and a lower storage portion. Because there is no connection between the down-feed tube and the deck, the deck may be located at various heights to provide a selection of display portion size.

The advantage of the present invention is that a showcase is provided that has the pleasing aesthetic appearance of the hand-welded and polished convention showcase, while requiring a greatly reduced amount of labor to fabricate and assemble the showcase. A showcase according to the invention is surprisingly strong and retains its appearance notwithstanding very rigorous use. Further, a showcase according to the present invention provides an optional lighting system that may be assembled with unskilled labor and which will meet code requirements. Further, a single illumination system, may be used with showcase configurations having merchandising compartments of various heights.

These and other related objects, advantages and features of this invention will become apparent upon review of the following specification in conjunction with the drawings.

BRIEF DESCRIPTION OF THE DRAWINGS

FIG. 5 is a partial sectional view taken along the lines V—V in FIG. 4;

FIG. 8 is a partial sectional view taken along the lines VIII—VIII in FIG. 5;

FIG. 12 is a partial sectional elevational view taken along the lines XII—XII in FIG. 5;

FIG. 13 is a partial sectional plan view taken along the lines XIII—XIII in FIG. 5;

FIG. 14 is a partial sectional elevational view of a lighting system according to an alternative embodiment of the invention showing the interior of the lighting fixture and a connector interface between a first portion of the electrical feed associated with the lighting fixture and a second portion of the electrical feed associated with the down-feed tube;

FIG. 15 is a partial sectional elevational view taken along the lines XV—XV of FIG. 5;

FIG. 16 is the same view as FIG. 5 of another alternative embodiment of the invention; and FIG. 17 is an enlarged partial perspective view of a corner post top portion according to yet another alternative embodiment of the invention.

DESCRIPTION OF THE PREFERRED EMBODIMENT

Figure 1:
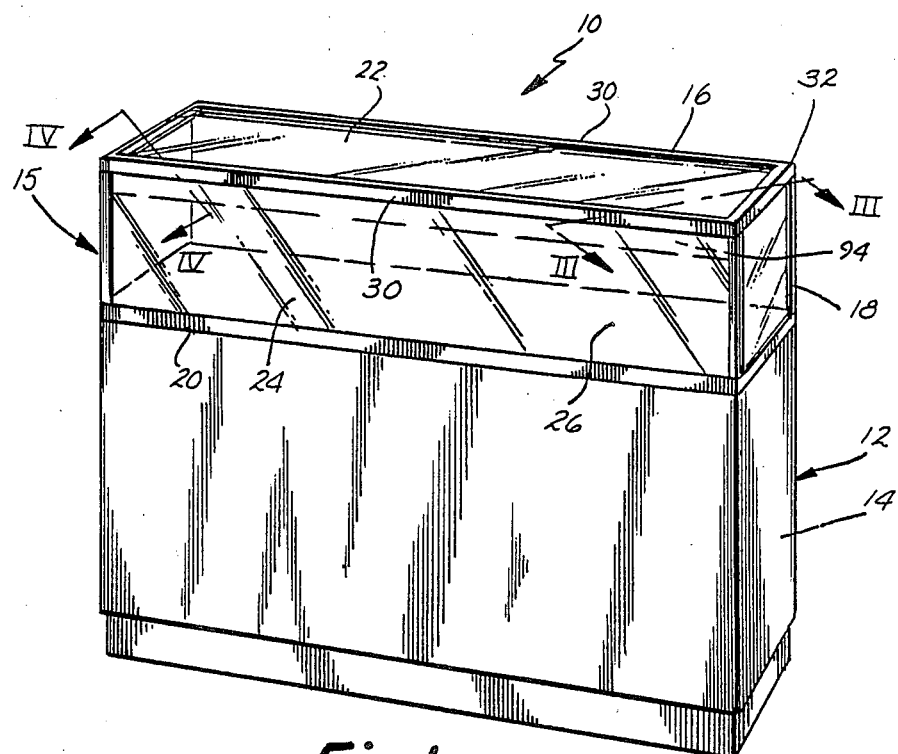
FIG. 1 is a front perspective view of a showcase according to the invention.

Referring now specifically to the drawings, and the illustrative embodiments depicted therein, a showcase 10 as seen in FIG. 1, has a body 12 which includes a base 14 and a frame 15 mounted to the base. Frame 15 includes a top frame member 16, a bottom frame member 20 attached to the base 14 and a plurality of corner posts 18 extending between the top and bottom frame members.

A transparent top window 22 is supported within top frame member 16 by gravity. A plurality of transparent side windows 24 are firmly retained within frame 15 by side window retention means which will be described in detail below. A deck 26 forms the top portion of bottom base 14 and provides means for supporting merchandise within a display portion 28 of the case (FIG. 5). Adjustable height legs (not shown) support base 14 off the floor. Lockable, rear doors 27 (FIG. 13) are laterally slidable in tracks 29 in order to provide access to display portion 28.

Figure 2:
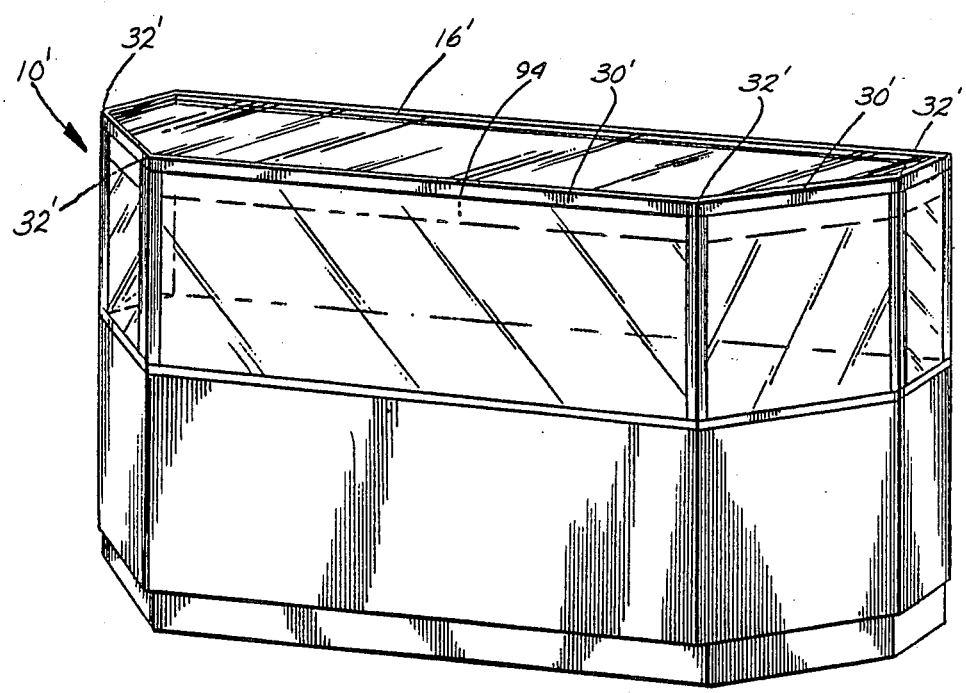
FIG. 2 is a front perspective view of another showcase according to the invention.

The showcase in FIG. 1 is rectangular, such that side members 30 of top frame member 16 are mutually perpendicular where joined in corners 32. In contrast, the showcase 10' in FIG. 2 is provided according to the invention and has a top frame member 16' constructed of side members 30' which are not mutually perpendicular but, rather, extend from corners 32' at obtuse angles. It is thus seen that the invention may be embodied in variously configured showcases.

Figure 3:
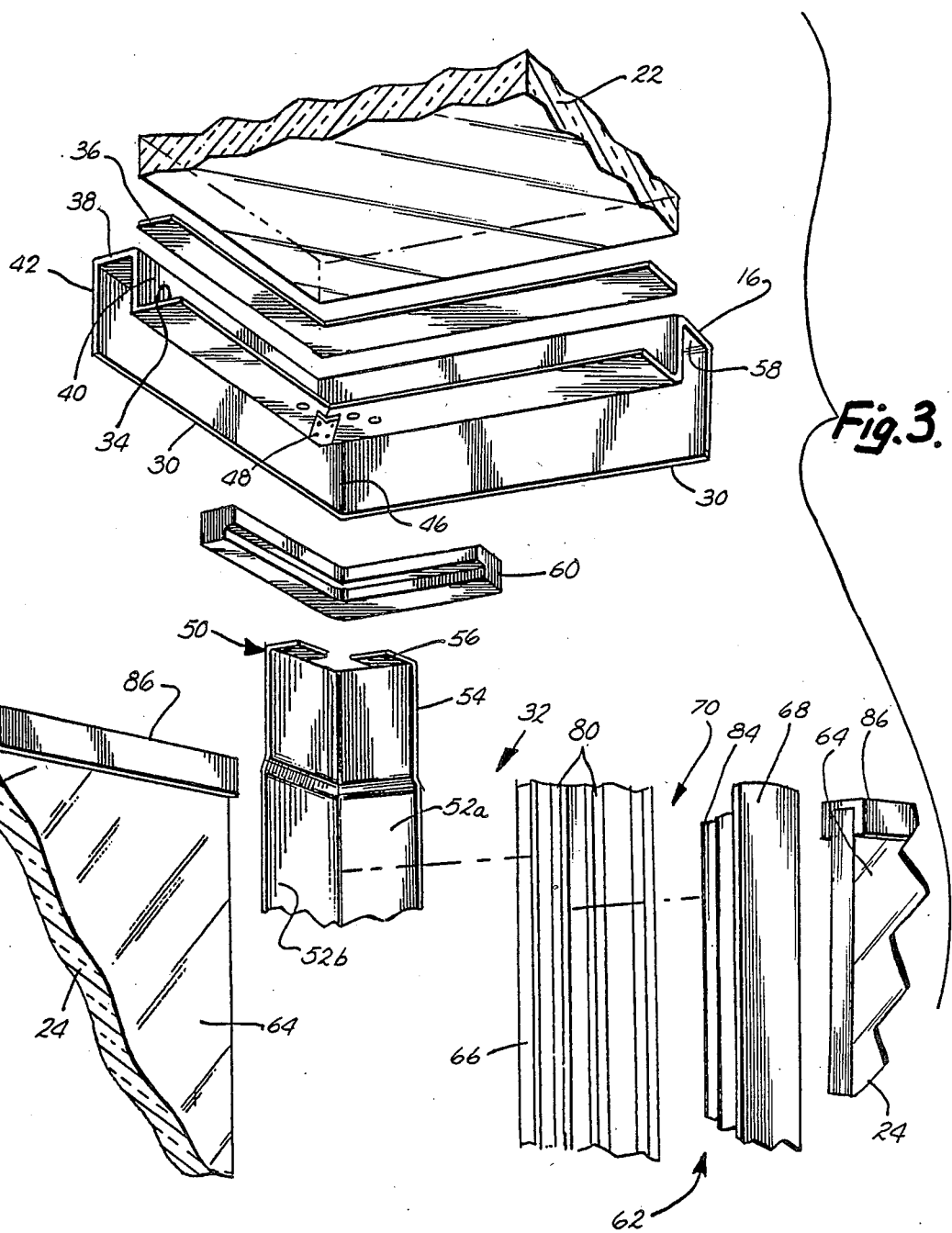
FIG. 3 is an enlarged exploded perspective view taken along the lines III—III in FIG. 1.

Referring to FIG. 3, top window 22 is supported on a first horizontal surface 34 of top frame member 16, with an opaque cushion 36 disposed between the top window and the frame member. A second horizontal surface 38 of the top frame member is located upward and outward of horizontal surface 34 and forms a border around the top window. A first vertical surface 40 extends between horizontal surfaces 34 and 38, and an outer second vertical surface 42 extends downwardly from surface 38. Cushion 36 may be supplied in various thicknesses to accommodate various thicknesses of top window 22 and may have adhesive on both top and bottom surfaces to secure the top window to the frame for showcases that are locked.

Figure 7:
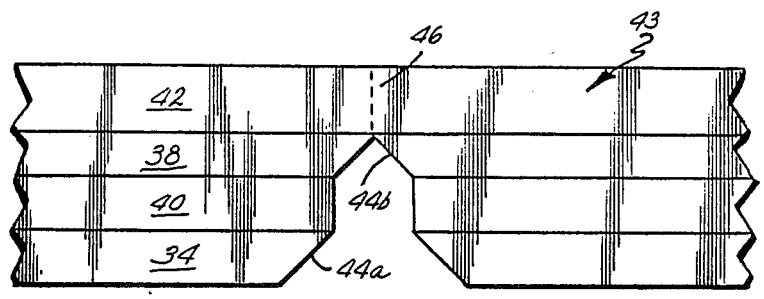
FIG. 7 is a view of a portion of a steel blank prior to being rolled and formed into the top frame member according to one embodiment of the invention.

As seen in FIG. 7, top frame member 16 is formed from a flat sheet of stainless steel that is notched, as illustrated, to form a pair of edges 44a and 44b. Stock 43 is formed into a three-dimensional top frame member 16 by a series of right angle bends roll-formed along the illustrated lines delineating the surfaces 34, 38, 40 and 42. In a preferred embodiment, the stock is roll-formed into a three-dimensional shape before edges 44a and 44b are formed therein so that the roll-forming step does not distort the position of edges 44a, 44b. Frame side members 30 are then formed horizontally along a vertical bend-line 46 in a manner that will move edges 44a and 44b toward each other until they abut. Bend-line 46 forms a seamless joint between surfaces 42 on adjoining side members 30. Abutting edges 44a, 44b are rigidly joined on horizontal surface 34 by joining means 48. In the illustrated embodiment, joining means 48 is a welding plate which is spot or tack welded to adjacent portions of surface 34 on adjacent side members. Because surface 34 is covered by cushion 36, which is opaque, any discoloration of the metal caused by the welding of the joining means 48 thereto will not be visible through the transparent top window. The portion of border surface 38 at each corner 32, which is not covered by cushion 36 and is thus visible, is pleasing in appearance because there is no welding occurring on this surface to cause discoloration, and the butt joint formed by edges 44a, 44b is very discrete and hence not noticeable.

Figure 9:
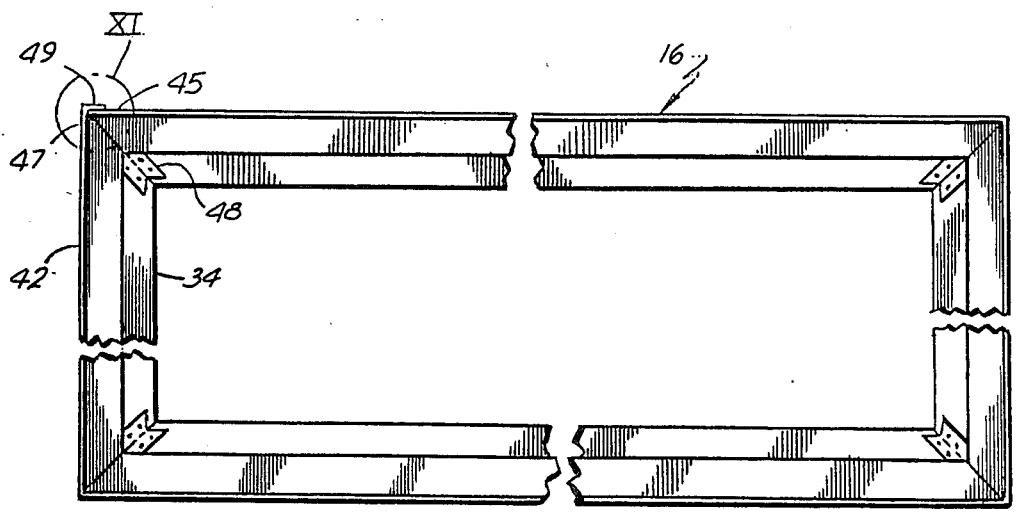
FIG. 9 is a bottom view of the top frame member.
Figure 11:
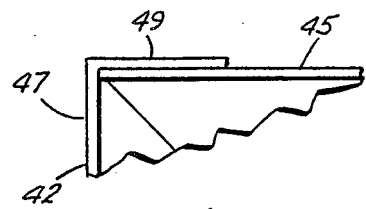
FIG. 11 is an enlarged partial plan view of the area indicated in FIG. 9 by the dotted circle.

As seen in FIGS. 9 and 11, a tab 49 extends at a right-angle from vertical surface 42 at one end 47 of stock 43. Tab 49 is rigidly fastened to opposite end 45 of stock 43 after the stock has been rolled and formed into a frame member in order to strengthen the frame member. The illustrated method of fastening tab 49 to opposite end 45 is by spot welding. The weld may be subsequently ground and polished.

Referring to FIG. 3, showcase corners 32 include corner posts 50 which are roll-formed of stainless steel. Each corner post has a pair of vertical sidewalls 52a, 52b that are angularly oriented according to the angle of the adjacent side members 30. Each corner post 50 has an inset top portion 54 that terminates in a pair of inwardly extending ears 56. Top portion 54 extends into a groove 58 in top frame member 16, defined by the area between vertical surfaces 40 and 42. Because top portion 54 is inset inwardly, vertical walls 52a and 52b will be flush with vertical surfaces 42 on the corresponding adjacent side members 30 to provide a pleasing appearance.

An L-shaped wedge member 60 is fitted into groove 58 after the top portion of corner post 50 has been inserted in the groove. Wedge member 60 is sized to frictionally engage the top portion of the corner post and the walls defining groove 58 to retain the corner post to the top frame. However, in the illustrated embodiment, an adhesive, such as an epoxy, is additionally applied to the upper and outer surfaces of wedge member 60 to adhesively join ears 56, vertical surfaces 40, 42 and horizontal surface 38 of adjacent side members 30. The purpose of wedge member 60 is also to align the vertical surfaces 52a, 52b of the corner posts with vertical surface 42 of the top frame and to distribute the bending moment between the corner post and top frame over a larger portion of the top frame.

An alternative embodiment corner post 50' is shown in FIG. 17. In this embodiment, one ear 56 is the same as previously described. The other ear 56' is extended downwardly in a vertical surface 157 and then inwardly in a horizontal surface 158. Surfaces 157 and 158 are dimensioned so that, with top portion 54' of corner post 50' inserted into groove 58 at the top frame, horizontal surfaces 158 will abut surface 34 of the top frame. The purpose of this configuration is to allow corner post surface 158 to be tack-welded to frame surface 34 for enhanced strength. Because the welding occurred on surface 34, any discoloration will be covered by opaque cushion 36.

Figure 10:
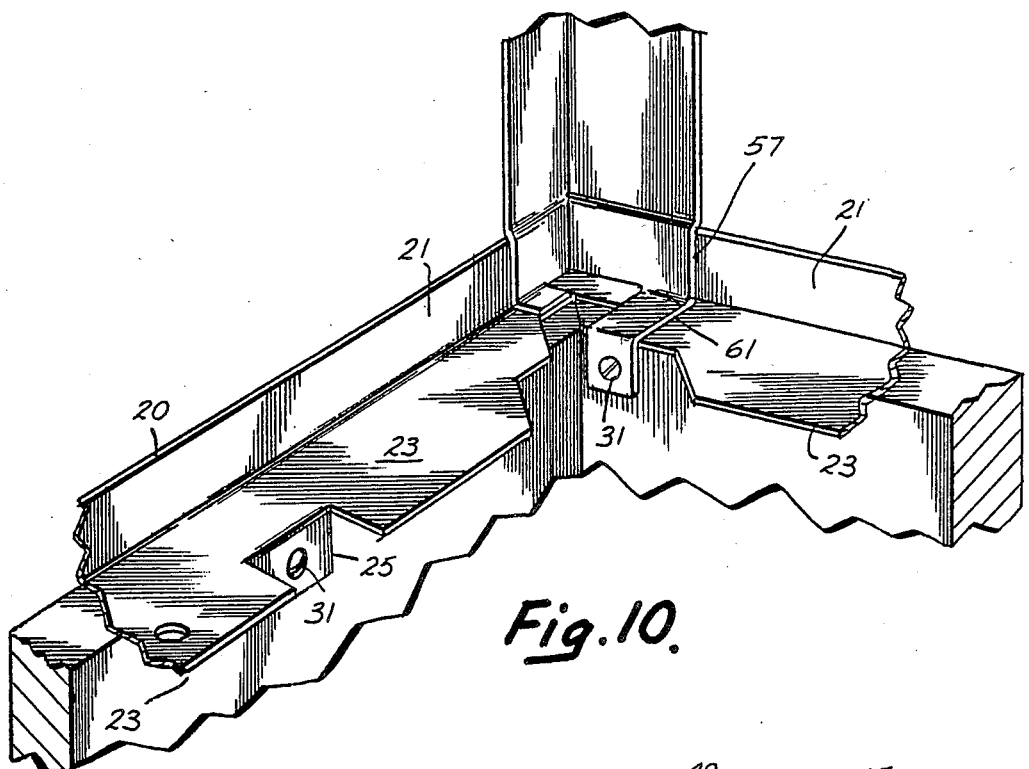
FIG. 10 is a perspective view showing the connections of the corner posts and bottom frame to the bottom base.

Referring to FIG. 10, bottom frame member 20 is formed in a manner similar to that used for forming top frame member 16, except that bottom frame member 20 includes only one horizontal surface 23 which is not visible when the showcase is assembled. A lower portion 57 of each corner post 50 is inset and has an ear 61 that may be attached to surface 23 of the bottom frame by spot welding or the like. Bottom frame member 20 includes a vertical surface 21 extending upwardly from horizontal surface 23. Tabs 25 extend downwardly from surface 23 and provide means for fastening the bottom frame member to base 14 with wood screws 31 or the like. Additional screws (not shown) may be inserted through openings (not shown) in surface 23 to provide additional attachment support of the frame to the base.

Figure 6:
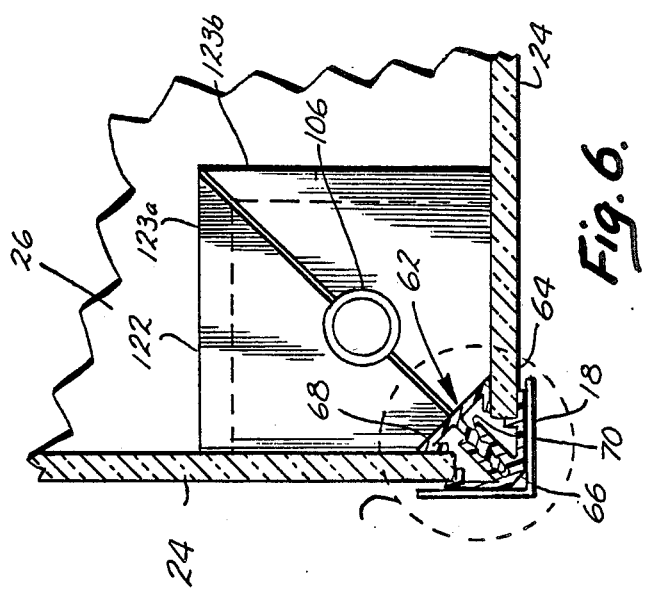
FIG. 6 is a partial plan view taken along the lines VI—VI in FIG. 5.
Figure 6A:
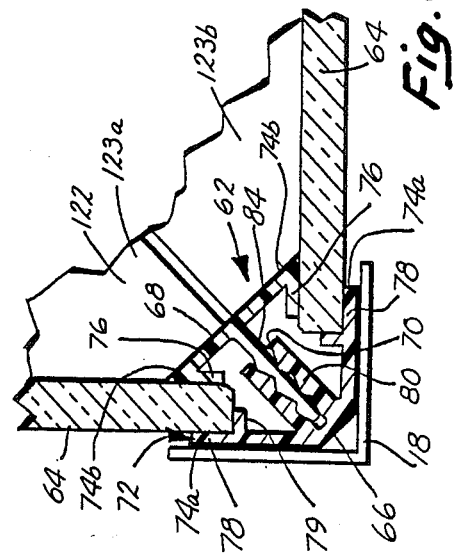
FIG. 6A is an enlarged partial plan view of the area indicated in FIG. 6 by the dotted circle.

Side window retention means includes a mounting device, generally shown at 62 (FIGS. 3, 6 and 6A), associated with each corner post which provides means for firmly retaining the lateral end portions 64 of the adjacent side windows 24. Each mounting device 62 includes an attachment member 66 that is shaped to substantially conform to the sidewalls 52a, 52b of the respective corner post and is held to the inside surfaces of the sidewalls by a contact adhesive. Each mounting device 62 further includes a retention member 68 that is engagable with attachment member 66 by engagement means 70 which, in the illustrated embodiment, includes a pair of spaced apart jaws 80 formed on an inner portion of attachment member 66 and a tongue 84 extending from retention member 68 and having debossments sized to engage embossments in jaws 80 in a snap-fitting manner.

Attachment members 66 and retention members 68 are extruded from a flexible polymeric material. Outer portions 74a and 74b thereof are extruded with a low durometer material which provides a high coefficient of friction. A first parallel surface 76 formed in the outer portion of retention member 68 and second parallel surface 78 formed in the outer portion of attachment member 66 produce a high friction engagement with the lateral end portions 64 of the side windows to provide gripping means, generally shown at 72, for frictionally gripping lateral ends 64 of the side windows. In the illustrated embodiment, members 66 and 68 are made from polyvinyl chloride material having a 53A durometer outer portion and 78D durometer inner portion. Methods for extruding a dual-durometer polymeric shape are well-known in the art and will not be described herein.

As seen in FIG. 5 several polymeric spacer members 86, which are short in length and have a cross section conforming substantially to the shape of groove 58, are frictionally retained in groove 58. A U-shaped high friction, resilient gasket 86 extends over upper and lower horizontal end portions 88 and 90 of side windows 24. With the upper horizontal end portion 88 of each window 24 and associated gasket 86 in groove 58 against spacer members 58, and the lower horizontal end 90 of each window 24 and associated gasket 86 in a groove formed between bottom frame 20 and a notch 91 in deck 26, the upper and lower horizontal end portions of each side window are frictionally engaged with the showcase frame and the center portions of members 30 are supported against sag. With all four end portions, lateral and horizontal, of the side windows frictionally engaged with the frame, the side windows become an integral part of the structure of the showcase which provides substantial rigidity to the showcase. In the illustrated embodiment, gaskets 86 are made from an elastomeric material having a 65A durometer.

As shown in FIG. 12, the upper horizontal joint between the top and side glasses is provided with a trim strip 85 to provide a pleasing appearance. In order to mount the trim strip, the polymeric spacer members provided on the lateral sides of the showcase, designated 82′, are each provided with a groove 83 therein. A tongue 84′ extending from trim strip 85 is snap-fit retained in grooves 83 to retain the trim strip. One feature of the invention is that trim strip 85 is identical to retention member 68 so that the number of component types needed to provide a complete showcase is reduced.

FIG. 13 illustrates the preferred structure of a rear corner of the cabinet. Mounting device 62′ includes an attachment member 66′ adhesively retained to the inner surfaces of sidewalls 52a and 52b of corner post 50. Attachment member 66′ includes two pair of jaws 80′ extending perpendicular from a base and which receive a pair of tongues 84″ extending from a retention member 68′. Members 66′ and 68′ have only one set of outer portions 74a′, 74b′ which receive lateral end portion 64 of the adjacent side window and provide gripping means for frictionally engaging the window. Retention member 68′ further includes a planar resilient bumper 87 to absorb the shock from the closing of rear door 27.

Figure 4:
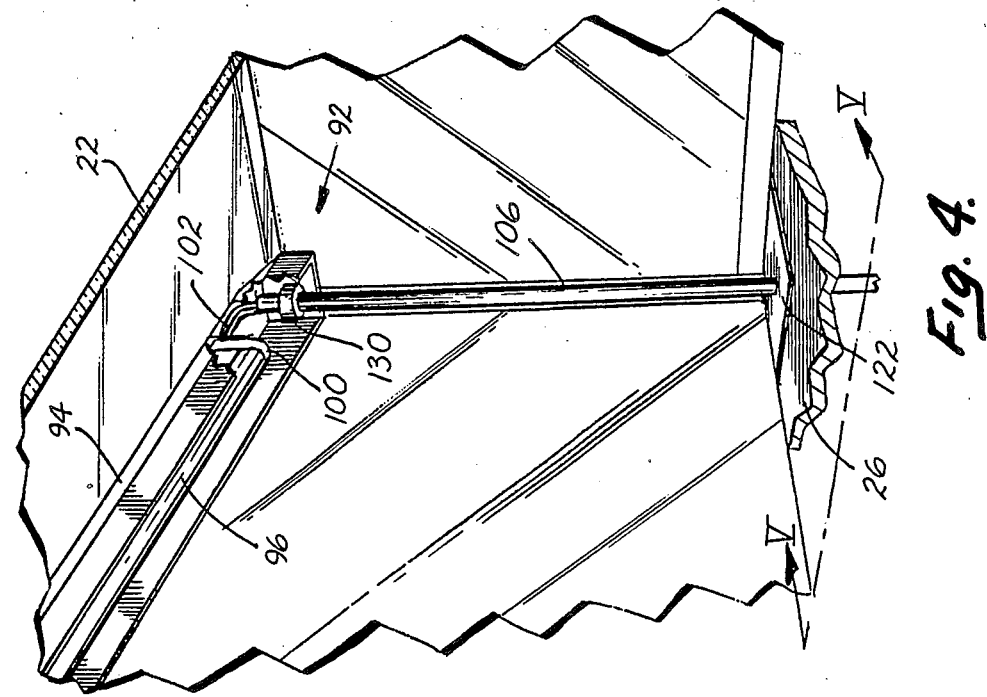
FIG. 4 is a perspective view taken along the lines IV—IV in FIG. 1.

Referring to FIGS. 4 and 5, a lighting system 92 is provided to illuminate merchandise within display portion 28 of the showcase. Lighting system 92 includes a lighting fixture 94 affixed by conventional means such as self-tapping screws (not shown) to a bottom portion of horizontal surface 34. One or more lamps 96, which may be conventional fluorescent tubes, are mounted below a bottom wall 98 of fixture 94 by connection to a pair of sockets 100, which traverse wall 98 and provide interconnection between lamp 96 and an electrical feed generally shown at 102. For clarity, lamp 96 and socket 100 are removed from FIG. 5.

Electrical feed 102 includes a plurality of electrical conductors 103 which extend from sockets 100 through a space 104 above bottom wall 98 and into a rigid down-feed tube 106. Down-feed tube 106 includes an upper end portion 120 and a rigid elbow 108 attached at a lower end portion 107 thereof. Electrical conductors 103 extend from sockets 100, through spacer 104, tube 106, an elbow 108 and a flexible conduit 110 where the conductors terminate in a connector 112. Connector 112, in turn, is connected with a mating electrical connector 113 in a ballast 114. Ballast 114 is otherwise conventional and is provided to transform 120 volt AC current to the voltage required to operate the fluorescent lamp 96. Bushings (not shown) are inserted inside end portions 120 and 107 of tube 106 to avoid fraying the insulation of conductors 103. Elbow 108 is attached to down-feed tube 106 and flexible conduit 110 by set screws 117 and to bottom member 116 by wood screw 119.

A code requirement for an AC electrical feed operating at or above the voltage of a conventional 120-volt current is that each insulated conductor be fully enclosed within a conduit, or the like. The present invention satisfies the above code requirement while providing a lighting system that may be folded to a compact shipping and storage configuration and which is easy to assemble to a use position. Referring to FIG. 5, rigid down-feed tube 106 is constructed having a critical predetermined length, shown as X, which is preselected such that, with elbow 108 against a bottom member 116 of base 14 and with down-feed tube 106 aligned with an opening 118 in bottom wall 98, upper end portion 120 of down-feed tube 106 will extend into space 104. End portion 120 will extend into space 104 because the distance between top frame 16 and bottom member 116 is constant for all configurations of showcase according to the invention. Therefore, with fixture 94 mounted to horizontal surface 34 and tube 106 aligned with opening 118, the attachment of elbow 108 to bottom member 116 will prevent down-feed tube 106 from being positioned such that first end 120 may extend outside of space 104. A stop-collar 130 is located a fixed distance from the end of upper end portion 120 and prevents upper end portion 120 from being forced up into space 104 which may damage conductors 103.

Rigid down-feed tube 106 extends through an opening 126 in deck 26 and is constrained to a vertical orientation by a deck plate 122 and keeper 124 which are configured to be uniquely located with respect to opening 126. A flange 128 on deck plate 122 provides such unique location. Deck plate 122 is divided into symmetrical segments 123a and 123b so that it may be applied around tube 106 after the tube is inserted in opening 126. Keeper 124 spans both segments 123 but extends only on one side of tube 106 and, therefore, is made in a single piece. Pins 125 extending from keeper 124 are frictionally received within sockets 127 extending from deck plate 122 to maintain these parts in aligned relationship.

A showcase having a lighting system according to the present invention retains flexibility because, even though the overall height of the showcase is kept constant for all configurations, the vertical depth of the display portion 28 may be significantly varied by adjusting the height of deck 26. For a larger display portion 28, deck 26 may be positioned closer to bottom member 116. For a smaller display portion, deck 26 is spaced further away from bottom member 116. Of course, corner posts 18′ and side windows 24 would be of different vertical length for display portions of different vertical depth.

Thus, when the lighting system is assembled in a showcase, deck plate 122 and keeper 124 will assure the proper alignment of down-feed tube 106 with opening 118 in fixture 94. The predetermined dimension X of down-feed tube 106 will assure that end portion 120 extends within wiring space 104 of fixture 94. Collar 130, positioned against bottom wall 98, will prevent rigid down-feed tube 106 from moving upwardly such that an upper edge may damage electrical conductors 103.

In order to assemble the lighting into a showcase, which is performed before top window 22 is installed, the down-feed tube 106 is pulled away from fixture 94 so that the connection therebetween is flexibly provided by conductors 103. Likewise, lower end portion 107 of the down-feed tube is removed from elbow 103 so that their connection is flexibly provided by conductors 103. The lighting assembly is inserted into the showcase while connector 112, conduit 110 and down-feed tube 106 are pulled through opening 126 in the deck plate 122 and through an opening 127 provided in bottom member 116. The lighting fixture 94 is attached to the top frame by flat-head screws driven downwardly through countersunk holes in surface 34. Down-feed tube 106 is inserted into a mating opening in elbow 108 and set screw 117 is fastened to provide a rigid connection therebetween. With top portion 120 aligned with opening 118, rigid tube 106 is thrust upwardly until elbow 108 abutting the bottom surface of member 116 and stop-collar 130 abutting fixture wall 98 prevent further upward movement of the tube. Screw 119 is then inserted in an opening in a flange 131 on the side of elbow 108 and driven into bottom member 116. A bottom plate 132 may be attached to the top surface of member 116 by a screw 133 to prevent items stored within the showcase base from falling into opening 127.

A first alternative embodiment of a showcase having a lighting system according to the invention is shown in FIG. 16. This embodiment includes the same general arrangement of components as shown in FIG. 5. However, rigid down-feed tube 106' is provided with a large-radius curved portion 135 oriented such that the portion of tube 106' within the displace portion 28' is closer to corners 32' than in the previously-described embodiments. The top portion of base 14' is notched in the vicinity of portion 135 to accommodate tube 106'. In this embodiment the lighting assembly will vary according to the height of deck 26' so that curved portion 135 will be vertically matched with the top of the base.

In this embodiment, the stop-collar 130 is molded from resinous plastic and has reduced diameter upper portion 137 which functions both to position collar 130 properly at the end of upper end portion 120 and to provide a bushing for the conductors 103.

A second alternative embodiment of a showcase having a lighting system according to the invention is shown in FIG. 14. In this embodiment viewed from the side of the lighting fixture, which is from the rear of the showcase, conductors 103" from the lamp sockets (not shown) terminate in a connector 140 which is mounted to a vertically upstanding tang 142 formed from bottom wall 98". A mating connector 144 is rigidly attached to upper end portion 120" of the rigid down-feed tube 106" and electrically connected to the conductors leading to the ballast connector (not shown). Down-feed tube 106" has a preselected length such that, when the elbow (not shown) at its lower end portion is abutting the lower member of the showcase base (not shown). Connectors 140 and 144 will be vertically aligned so that slight lateral movement of connector 144 to the left, as viewed in FIG. 14, will cause the connectors to engage.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows.

1. An improved display case having a base, a frame supported on said base, and glass panels supported within said frame, wherein the improvement comprises said frame comprising:
   an upper horizontal frame uniform in cross section and defining a downwardly opening channel;
   a plurality of vertical corner members supporting said horizontal frame above said base, each corner member including an upper end fitted within said channel; and
   wedge means for securing said upper ends of said vertical members within said channel of said horizontal frame, said wedge means being force-fitted within said channel to force said upper end of said corner member into engagement with said upper frame.

2. An improved display case as defined in claim 1 wherein said horizontal frame is fabricated of a single frame member.

3. An improved display case as defined in claim 1 wherein:
   said frame includes two portions meeting at a corner, each of said portions including a glass-supporting flange under said glass, said glass-supporting flanges abutting one another; and
   intersecuring means for intersecuring said abutting glass-supporting flanges only on a side of said flanges opposite said glass, whereby said flanges provide a continuous surface through said corner.

4. An improved display case as defined in claim 1 wherein said upper end of said corner member includes:
   a side portion parallel to and adjacent the side of said channel; and
   a top portion parallel to and adjacent the floor of said channel, said wedge engaging both of said side and top portions.

5. An improved display case as defined in claim 4 wherein said side portion is laterally offset from the remainder of said corner post, whereby said corner post and said upper frame are substantially flush.

6. An improved display case as defined in claim 1 wherein said upper end of said corner post is laterally offset from the remainder of said corner post, whereby said corner post and said upper frame are substantially flush.

* * * * *